US009678483B2

(12) United States Patent
Nordberg et al.

(10) Patent No.: US 9,678,483 B2
(45) Date of Patent: Jun. 13, 2017

(54) PROGRAMMABLE CONTROLLER WITH BOTH SAFETY AND APPLICATION FUNCTIONS

(75) Inventors: Timothy J. Nordberg, Edina, MN (US); Jim I. Bartels, Hudson, WI (US); Nathan Longen, White Bear Township, MN (US)

(73) Assignee: Honeywell International Inc., Morris Plains, NJ (US)

( * ) Notice: Subject to any disclaimer, the term of this patent is extended or adjusted under 35 U.S.C. 154(b) by 1881 days.

(21) Appl. No.: 13/014,323

(22) Filed: Jan. 26, 2011

(65) Prior Publication Data

US 2012/0191226 A1 Jul. 26, 2012

(51) Int. Cl.
*G05B 9/02* (2006.01)
*G05B 19/042* (2006.01)

(52) U.S. Cl.
CPC ........... *G05B 9/02* (2013.01); *G05B 19/0425* (2013.01)

(58) Field of Classification Search
CPC ...................................................... G05B 9/02
USPC ................................. 700/79, 21; 431/73, 16
See application file for complete search history.

(56) References Cited

U.S. PATENT DOCUMENTS

| | | | |
|---|---|---|---|
| 4,872,828 A * | 10/1989 | Mierzwinski et al. | 431/16 |
| 5,506,792 A | 4/1996 | Adelson et al. | |
| 5,553,237 A | 9/1996 | Eisenberg et al. | |
| 5,572,671 A | 11/1996 | Eisenberg et al. | |
| 6,647,301 B1 * | 11/2003 | Sederlund et al. | 700/79 |
| 7,289,861 B2 | 10/2007 | Aneweer et al. | |
| 7,330,768 B2 | 2/2008 | Scott et al. | |
| 7,395,123 B2 | 7/2008 | Papenbreer et al. | |
| 7,546,499 B1 | 6/2009 | Shafer et al. | |
| 7,694,250 B2 | 4/2010 | Boutin | |
| 7,712,089 B2 | 5/2010 | Opem et al. | |
| 7,784,062 B2 | 8/2010 | Droba | |
| 7,813,820 B2 | 10/2010 | Opem et al. | |
| 7,856,624 B2 | 12/2010 | Plum | |
| 7,865,251 B2 | 1/2011 | Law et al. | |

OTHER PUBLICATIONS

Honeywell, "Excel Building Supervisor-Integrated R7044 and FS90 Ver. 2.0," Operator Manual, 70 pages, Apr. 1995.
Trane, "System Programming, Tracer Summit Version 14, BMTW-SVP01D-EN," 623 pages, 2002.
"Commercial Sola Terminals," Diagram, 1 page, Mar. 2, 2010.
Honeywell, "7800 Series Burner Control," 27 pages, Jan. 1998.
Honeywell, "7800 Series Programmer Control, A Guide Specification for the Engineer," 4 pages, 2000.
Honeywell, "ICP Safety Features Block Diagram," 1 page, Aug. 28, 2007.
Honeywell, "Software Interface Specfication, Sola Modbus Interface," Product Data, 50 pages, 2010.

* cited by examiner

*Primary Examiner* — Tejal Gami
(74) *Attorney, Agent, or Firm* — Seager, Tufte & Wickhem, LLP

(57) ABSTRACT

A controller that controls both safety and application functions of connected equipment is disclosed. The controller allows a user to freely program application specific functions while preventing the application functions from affecting the safety functions of the controller. This may give the user more flexibility and leeway when programming the application specific programming functions, without having to worry about affecting the safe operation of the connected equipment.

17 Claims, 2 Drawing Sheets

PROGRAMMABLE CONTROLLER WITH BOTH SAFETY AND APPLICATION FUNCTIONS

FIELD

Figure 1:
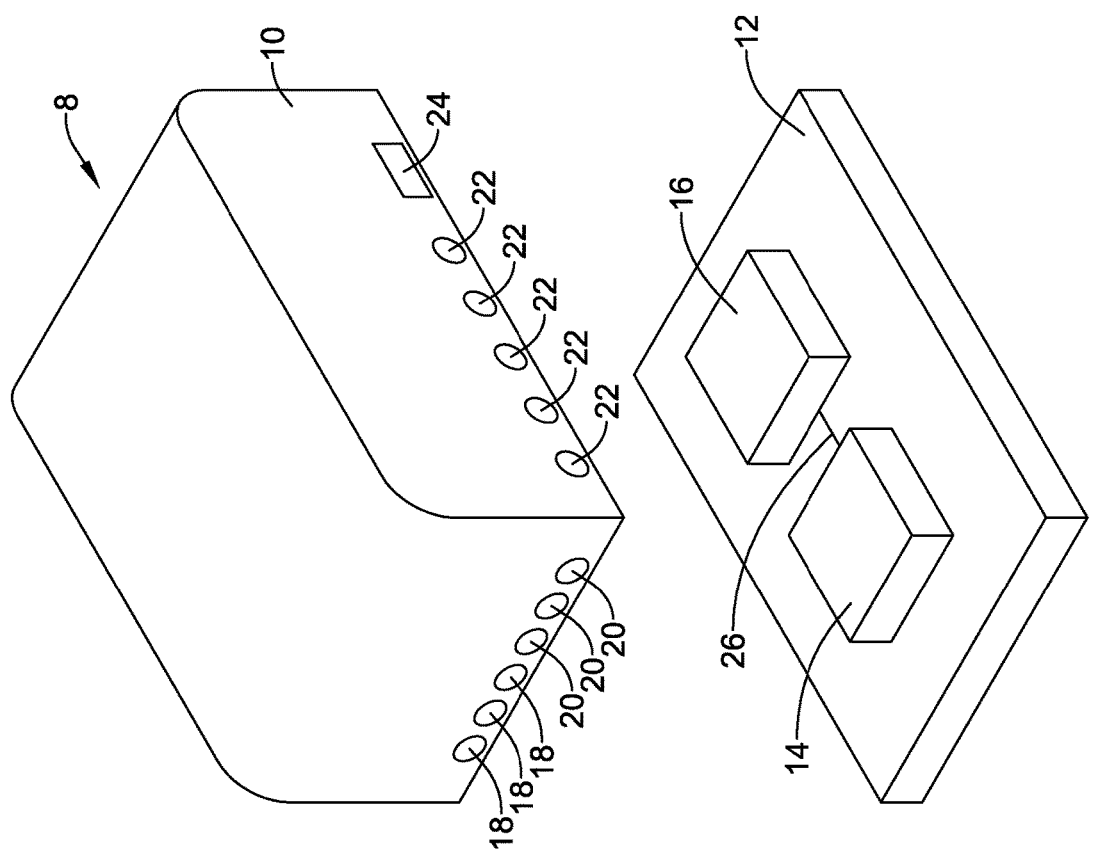

The present disclosure relates generally to programmable controllers, and more particularly, to programmable controllers that include both safety and application functions.

BACKGROUND

Programmable digital controllers are used to control a wide variety of equipment. Some equipment, such as combustion equipment, must be operated in accordance with certain safety protocols (or functions) in order to help ensure safe operation of the equipment. For example, an over-simplified safety protocol for an HVAC burner may include: verifying the presence of a pilot flame before opening the main gas valve of the burner; and once the main gas valve is opened, continually verifying the presence of the main flame in order to keep the main gas valve open. In this simplified example, it may be determined that if this safety protocol is not followed, the burner may not operate safely under all anticipated operating conditions. That is, it may be determined that if the main flame goes out and the main gas valve remains open, a potentially unsafe condition may exist in the form of un-combusted gas flowing into the appliance. A burner controller is often provided to perform these functions.

It is also sometimes desirable to provide some level of application specific programming in order to incorporate application specific control behaviors in the system. For example, and returning to the HVAC burner example above, it may be desirable for an installer or user to program temperature control algorithms for setting the modulation rate of the burner, program certain temperature set points based on building occupancy or a pre-programmed temperature schedule, etc. In many instances, a separate application controller is used to control the application specific programming.

SUMMARY

The following summary is provided to facilitate an understanding of some of the innovative features unique to the present disclosure and is not intended to be a full description. A full appreciation of the disclosure can be gained by taking the entire specification, claims, drawings, and abstract as a whole.

The present disclosure relates generally to programmable controllers, and more particularly, to programmable controllers with both safety and application functions. In one illustrative embodiment, a programmable controller is provided that controls both safety and application functions, but allows application specific functions to be programmed by a user without affecting the safety functions of the controller. In some instances, a controller includes a safety processor that includes pre-programmed safety functions that are specifically designed to safely operate connected equipment. The safety functions may be carefully pre-programmed such that a user has only pre-defined equipment configuration and/or pre-defined selection options. The controller may also include an application processor for controlling application specific programmable functions of the connected equipment. The application processor may be separate from the safety processor, but may be in communication with the safety processor via a communication link. In some instances, the application specific programmable functions may be fully and freely programmable by a user. The controller may prevent the application specific programmable functions programmed by the user from overriding or otherwise affecting the safety functions of the safety processor. This may give the user more flexibility and leeway when programming the application specific programming functions, without having to worry about affecting the safe operation of the connected equipment.

An illustrative method for operating a controller may include allowing a user to select an equipment configuration from a plurality of pre-defined equipment configurations and/or one or more pre-defined selection options, the selected equipment configuration and/or the selected pre-defined selection options defining, at least in part, the safety functions of a safety processor of the controller, allowing a user to program one or more application specific programmable functions for an application processor of the controller, and preventing the one or more application specific programming functions from overriding or otherwise affecting the safety functions of the safety processor.

The above summary is not intended to describe each and every disclosed embodiment or every implementation of the disclosure. The Figures and Description which follow more particularly exemplify certain illustrative embodiments.

BRIEF DESCRIPTION

Figure 2:
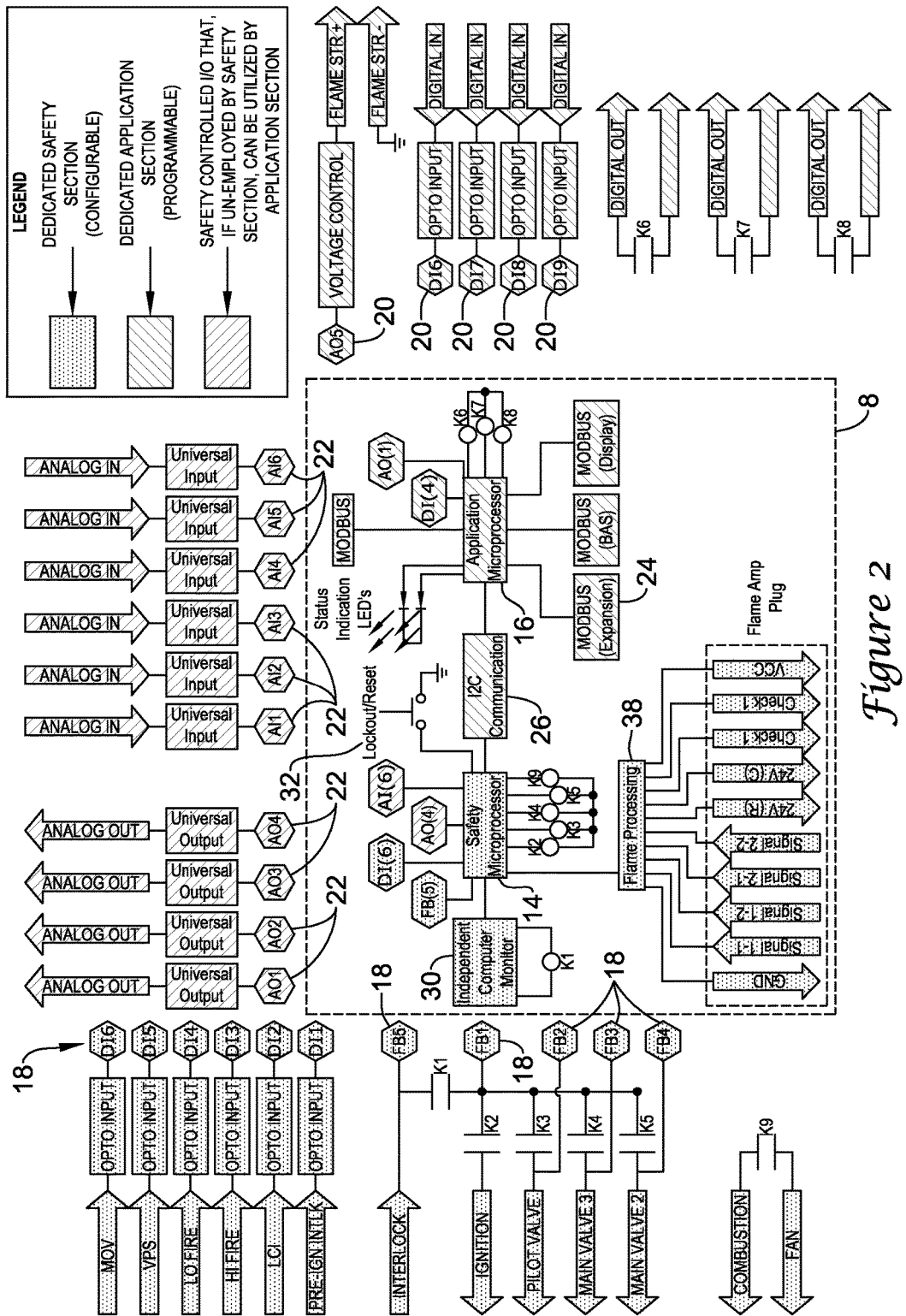

The disclosure may be more completely understood in consideration of the following description of various illustrative embodiments in connection with the accompanying drawings, in which:

FIG. 1 is a schematic perspective view of an illustrative programmable controller; and FIG. 2 is a schematic diagram of the illustrative programmable controller of FIG. 1.

While the disclosure is amenable to various modifications and alternative forms, specifics thereof have been shown by way of example in the drawing and will be described in detail. It should be understood, however, that the intention is not to limit the disclosure to the particular embodiments or examples described. On the contrary, the intention is to cover all modifications, equivalents, and alternatives falling within the spirit and scope of the disclosure.

DESCRIPTION

The following description should be read with reference to the drawings in which similar elements in different drawings are numbered the same. The drawings, which are not necessarily to scale, depict certain illustrative embodiments and are not intended to limit the scope of the disclosure.

FIG. 1 is a schematic perspective view of an illustrative programmable controller 8 for use in control connected equipment (not shown). In some instances, the connected equipment may include combustion equipment, such as a furnace, a boiler, a water heater or any other combustion equipment as desired. While combustion equipment is used as an example, it is contemplated that the connected equipment may be any suitable type of equipment, as desired.

In one illustrative example, the programmable controller 8 may include a safety processor for controlling safety functions of the connected equipment, and an application processor for controlling application specific programmable functions of the connected equipment. The programmable controller 8 may have the capability to control a wide variety of different equipment. In the field, an installer may configure the programmable controller 8 to control particular equipment that is to be connected to the programmable controller 8. For the safety functions, the installer may configure the programmable controller 8 by, for example, selecting one or more pre-defined configurations that correspond to the particular equipment to be controlled and/or by making one or more selections from among pre-defined selection options (e.g. pre-purge time—one of three pre-defined choices, flame threshold—within a predefined valid range, etc). In many instances, the safety functions may be pre-programmed and carefully designed, sometimes to certified safety standards, to help ensure the safe operation of the connected equipment. As such, the programmability of the safety functions by an installer and/or other user may be limited, such as limited to the selection of one or more predefined and often carefully designed configurations and/or selection options. For the application functions, the installer may freely program one or more application functions, without needing to worry about affecting the safe operation of the connected equipment.

Turning specifically to FIG. 1, an illustrative programmable controller 8 is shown. The illustrative programmable controller includes a housing 10, which may house a circuit board 12 that mounts a safety processor 14 and a separate application processor 16. While a safety processor 14 and an application processor 16 are shown as separate processor devices housed in their own packages, it is contemplated that the safety processor 14 and the application processor 16 may be mounted in a common package, but preferably partitioned into two separate partitions. Also, while the safety processor 14 and the application processor 16 are shown mounted to a common printed circuit board 12, this is not required in all embodiments. In FIG. 1, the circuit board 12, safety processor 14 and application processor 16 are shown outside of the housing 10 for clarity. However, when assembled, and in the illustrative embodiment, it is contemplated that the circuit board 12, safety processor 14 and application processor 16 may be located within and protected by the common housing 10.

The illustrative programmable controller 8 also includes a plurality of safety input/outputs (I/O) 18, which may be controlled by the safety processor 14 and dedicated to safety functions of the programmable controller 8. Also shown are a plurality of application input/outputs (I/O) 20, which may be controlled by the application processor 16 and may be dedicated to the application specific programmable functions of the programmable controller 8. Also shown are a plurality of configurable input/outputs (I/O) 22, which may be controlled by the safety processor 14. In some instances, each of the plurality of configurable input/outputs (I/O) 22 may be configurable by the safety processor 14 to be selectively controllable by the application processor 16 via a communication link 26 and the safety processor 14.

In the illustrative embodiment of FIG. 1, the housing 10 may locate the plurality of safety input/outputs (I/O) 18, the plurality of application input/outputs (I/O) 20, and/or the plurality of configurable input/outputs (I/O) 22, if desired. In some instances, the housing 10 may be a unitary one-piece housing 10, or a two (or more) piece housing 10, depending on the application. In some cases, the housing 10 may include a main housing and a sub-base (not shown), wherein the main housing is detachable from the sub-base. In some cases, there may be one or more electrical connectors between the main housing and the sub-base for passing electrical signals therebetween. In some instances, the sub-base of the housing 10 may locate the plurality of safety input/outputs (I/O) 18, the plurality of application input/outputs (I/O) 20, and/or the plurality of configurable input/outputs (I/O) 22, if desired.

It is contemplated that one or more expansion module ports 24 may be included. By connecting an expansion module (not shown) to the expansion module port 24, the number of application input/outputs (I/O) 20 that can be controlled by the application processor 16, and dedicated to the application specific programmable functions, may be increased. The programmable controller 8 may also include one or more other ports, such as one or more ports for programming the application processor 16 and/or safety processor 14, as desired.

It is contemplated that the safety processor 14 may include safety functions that safely operate connected combustion equipment. The safety functions may be pre-programmed such that a user cannot override the safety functions of the safety processor 14. In some cases, an installer or other user can select one of two or more pre-defined equipment configurations, where each of the two or more pre-defined equipment configurations correspond to different connected equipment. This may allow the installer or other user to use the programmable controller 8 with different equipment/equipment combinations. Alternatively, or in addition, an installer or other user may making one or more selections from among a number of pre-defined selection options (e.g. pre-purge time—one of three predefined choices, flame threshold—within a predefined valid range, etc.). It is contemplated that the configuration of the safety functions by an installer and/or other user may be limited to, for example, the selection of one or more predefined and often carefully designed equipment configurations and/or certain parameter selection options.

The application processor 16 may control application specific programmable functions of the connected equipment. As can be seen, the application processor 16 may be separate from the safety processor 14, and in communication with the safety processor via a communication link 26. The application specific programmable functions of the application processor 16 are typically programmable by a user. The programmable controller is configured such that the application specific programmable functions of the user are prevented from overriding or otherwise affecting the safety functions of the safety processor 14. This may give the user more flexibility and leeway when programming the application specific programming functions of the application processor 16, without needing to worry about affecting the safe operation of the connected equipment.

An illustrative method for operating a programmable controller 8 may include allowing a user to select an equipment configuration from a plurality of pre-defined equipment configurations and/or selections from a number of pre-defined options, the selected equipment configuration and/or selections from a number of pre-defined options defining the safety functions of a safety processor 14 of the programmable controller 8, allowing a user to program one or more application specific programmable functions for an application processor 16 of the programmable controller 8, and preventing the one or more application specific programming functions from overriding or otherwise affecting the safety functions of the safety processor 14.

FIG. 2 is a schematic diagram of the illustrative programmable controller 8 of FIG. 1. In FIG. 2, the programmable controller 8 is generally represented by the dashed rectangle, with internal circuitry being contained within the rectangle and electrical connections to external devices (e.g. connected equipment) extending outward from an edge of the rectangle. In one illustrative application, which is not deemed to be limiting, it is contemplated that the programmable controller 8 may be used to control an HVAC system that includes a burner as a heat source. In other instances, the programmable controller 8 may be used to control any sort of combustion equipment, such as a furnace, a boiler, a water heater or any other combustion equipment as desired. While combustion equipment is used as an example, it is contemplated that the programmable controller 8 may be used to control any suitable type of equipment, as desired.

In one illustrative embodiment, the programmable controller 8 includes built-in safety functions for controlling a burner, and the safety functions may be integrated into the programmable controller 8 so they may not be overridden by an installer and/or other user. For example, some safety functions may include burner control sequences, fuel-air ratio control and/or other safety critical burner control functions, depending on the particular burner equipment used.

In some cases, the safety functions may include monitoring and/or controlling particular quantities that are outside the programmable controller 8, sometimes using a number of dedicated electrical input/outputs (I/O) that are designated for use only with the safety functions (see legend in FIG. 2). When so provided, the safety-only input/outputs (I/O) may be analog, digital, or a combination of analog and digital, as desired.

It is contemplated that the built-in safety functions may be handled by a safety processor 14. In the example shown in FIG. 2, the safety processor 14 may be dedicated to performing only the designated safety functions, and as such, it is shown drawn with a dotted background. In FIG. 2, there are various components inside the programmable controller 8 that are also dedicated to performing the safety functions (see legend in FIG. 2). In the specific embodiment of FIG. 2, which is not deemed to be limiting, in addition to the safety processor 14, the safety-only components may include an Independent Computer Monitor (ICM) block 30, a lockout/reset block 32, six digital inputs 18 including, for example, a Pre-Ignition Interlock input (DI1), a Lock Out Interlock input (DI2), a High Fire Rate input (DI3), a Lo Fire Rate input (DI4), a Valve Providing System input (DI5) and a Manual Valve Open input (DI6). In the illustrative example, five burner control output signals may also be dedicated to the safety functions including, for example, an Ignition output (FB1), a Pilot Valve output (FB2), a Main Valve 3 output (FB3) and a Main Valve 2 output (FB4), along with an Interlock input (FB5). The safety processor 14 may also communicate with a Flame Processing module 38, which receives and provides electrical inputs and outputs via a Flame Amp Plug 40. The Flame Amp Plug 40 may be connected to a flame amplifier (not shown) that is specific for the particular flame sensor technology used (e.g. UV, IR, flame rectification, etc.) in the particular burner system.

In the illustrative embodiment of FIG. 2, there is a limited amount of user-customization that can be done with configuring the safety processor 14. In some cases, the user can select among two or more pre-defined equipment configurations. The pre-defined equipment configuration may be selected by the installer to correspond to the equipment that is actually connected to the programmable controller 8. This may allow the installer or other user to use the same programmable controller 8 to control various types of equipment/equipment combinations. Alternatively, or in addition, the user can make one or more selections from among pre-defined selection options (e.g. pre-purge time—one of three predefined choices, flame threshold—within a pre-defined valid range, etc.). It is contemplated that each of the two or more pre-defined equipment configurations and/or the pre-defined selection options that are made available to the user may be written in a fail-safe, deterministic way, and all may be certified to conform to software safety standards. This may minimize the risk of unsafe operation of the equipment.

The illustrative programmable controller 8 may also include an application processor 16, which may allow flexible application specific (as opposed to equipment specific) programming by the user. Unlike the tightly controlled and limited choices available for configuring the safety processor 14, the programming options for the application processor 16 may be much more open, rich and flexible. In some instances, the application processor 16 may be dedicated to only the user programmable features in the programmable controller 8, and as such, is shown drawn with a top-right-to-bottom-left cross-hatched background (see legend in FIG. 2).

One example of the programming infrastructure that may be used by the user to program the application processor 16 is disclosed by Michael A. Pouchak, et al. in U.S. patent application Ser. No. 11/670,911, titled "System level function block engine", filed on Feb. 2, 2007, and published on Jan. 17, 2008 as U.S. Patent Application Publication No. 2008/0016493, which is incorporated by reference in its entirety. The described function block engine and associated programming infrastructure may allow a user to more easily program whatever function is desired into the application processor 16. For instance, the described function block engine and associated programming infrastructure may allow a user to relatively easily program the application processor 16 to set a modulation rate of the system, modify various set points based on building occupancy or on a pre-programmed profile or schedule, or perform any number of other application specific functions. Since, in some instances, the functions performed by the application processor 16 are not safety critical, the user may be given great latitude and freedom in programming the application processor 16. Since the application processor 16 may be partitioned separately (either through hardware of software) from the safety processor 14, the application specific programmable functions may be effectively prevented from overriding or otherwise affecting the safety functions of the safety processor 14 of the programmable controller 8.

Physically, the application processor 16 may be a separate hardware component within the programmable controller 8, which may help ensure that the instructions executed on the application processor 16 do not affect the safety performance of the safety processor 14. Alternatively, the application processor may be integrated with the safety processor 14, but preferably partitioned from the safety processor 14 in some other way (e.g. virtually in software, etc.).

In some instances, there may be various components of the programmable controller 8 that are dedicated to user-programmable (non-safety) functions. In the specific example of FIG. 2, and in addition to the application processor 16, the user-programmable components may include various MODBUS elements, such as for Expansion, Building Automation System (BAS) and Display, various Status Indication LED's, four digital inputs (DI6, DI7, DI8, DI9), and one analog output (AO5), which is a voltage control that drives a Flame Strength Indicator, when appropriate.

The illustrative programmable controller 8 may also include an I2C Communication module (i.e. communication link) 26, which in the illustrative embodiment, is dedicated to the user-programmable functions and provides two-way communication between the safety processor 14 and the application processor 16. In the specific example shown in FIG. 2, the I2C Communication module 26 is shown as a separate component. However, it is contemplated that the I2C Communication module 26 may be integrated into the safety processor 14 and/or the application processor 16, if desired.

In some instances, there may be a series of input/outputs (I/O) 22 that are configurable, meaning that they may be controlled (drive and/or received) by the safety processor 14, but in some instances, controllable by the application processor 16 upon request. In some instances, each of the plurality of configurable input/outputs (I/O) 22 are configurable by the safety processor 14 to be selectively controllable by the application processor 16 (via the communication link 26 and the safety processor 14), and may be assigned to perform user-programmable functions running on the application processor 16.

In the illustrative embodiment of FIG. 2, such configurable input/outputs (I/O) 22 are denoted by top-left-to-bottom-right cross-hatching (see legend in FIG. 2). In FIG. 2, the configurable input/outputs (I/O) 22 include six analog inputs (labeled as AI1 through AI6) and four analog outputs (labeled as AO1 through AO4). In other cases, more or few inputs and/or outputs may be considered configurable input/outputs (I/O) 22. In some cases, the inputs may remain as inputs and the outputs may remain as outputs, whether configured to perform safety functions or user-programmable non-safety functions. In other words, each input/output (I/O) may be designated as being either an input or an output, but this is not required. In the specific example of FIG. 2, the configurable input/outputs (I/O) 22 are all analog. In other cases, some or all may be digital.

If the safety processor 14 does not require any or all of the configurable input/outputs (I/O) 22 for a particular selected configuration, then those configurable input/outputs (I/O) 22 that are unused for safety may be made available to the application processor 16 for user-programmable functions. The subset of configurable input/outputs (I/O) 22 that are unused for safety may be referred to as "excess" input/outputs (I/O), and may have any number of input/outputs (I/O) from zero up to the number of configurable input/outputs (I/O).

In some cases, software running on the application processor 16 may place a request to the safety processor 14 to obtain control over one or more of the configurable input/outputs (I/O) 22. The safety processor 14 may then check to see if the configurable input/outputs (I/O) 22 are not already assigned to a safety function. If particular configurable input/outputs (I/O) 22 are not assigned to a safety function and are otherwise available, then the safety processor 14 may assign the configurable input/outputs (I/O) 22 to the application processor 16 and drive the corresponding configurable input/outputs (I/O) 22 as instructed to by the application processor 16. That is, the configurable input/outputs (I/O) 22 that are assigned to the application processor 16 may be considered to be controllable by the application processor 16 via the communication link 26 and the safety processor 14.

In one example, the application processor 16 may send a request to the safety processor 14 with a set of input/output (I/O) needs. The safety processor 14 may then determine which of the plurality of configurable input/outputs (I/O) 22 are not assigned to a safety function. Those configurable input/outputs (I/O) that are not assigned to a safety function may form an excess input/output (I/O) group. The safety processor 14 may then assign at least one of the excess input/output (I/O) group to address the set of input/output (I/O) needs of the application processor 16.

As another example, the controller may detect that the application processor 16 is limited in a number of dedicated application input/outputs (I/O) 20. The application processor 16 may place a request to the safety processor 14 for at least one additional input/output (I/O). The controller may then determine that at least one configurable input/output (I/O) 22 is not being used for the safety functions. The safety processor 14 may then drive the at least one configurable input/output (I/O) 22 not being used for the safety functions as at least one application input/output (I/O) that performs respective programmable functions of the application processor 16.

As noted above, it is contemplated that the safety processor may be programmable with a selected one of two or more pre-defined equipment configurations, wherein each of the two or more pre-defined equipment configurations corresponds to a different combustion equipment configuration. In some cases, a first one of the two or more pre-defined equipment configurations will require a first set of the plurality of configurable input/outputs (I/O) 22 for supporting the safety functions, and a second one of the two or more pre-defined equipment configurations may require a second set of the plurality of configurable input/outputs (I/O) 22 for supporting the safety functions, wherein the first set is different from the second set. Depending on the selected pre-defined equipment configuration, a different number of configurable input/outputs (I/O) may be made available and thus controllable by the application processor 16 through the communication link 26 and the safety processor 14.

In this manner, the user-programmable functions of the application processor 16 may expand to include more input/outputs (I/O) without requiring the use of additional hardware, thereby saving size, cost and effort, and all the while not compromising the safety performance of the programmable controller 8. If more input/outputs (I/O) are needed for the user-programmable tasks of the application processor 16 than are available on the programmable controller 8, the programmable controller 8 may be connected to one or more input/outputs (I/O) expansion modules through one or more expansion module ports 24.

It should be understood that this disclosure, in many respects, is only illustrative. Changes may be made in details, particularly in matters of shape, size, and arrangement of steps without exceeding the scope of the disclosure.

What is claimed is:

1. A combustion controller configured for controlling combustion equipment, the combustion controller comprising:
    a safety processor including safety functions that safely operate the combustion equipment, wherein the safety functions are pre-programmed with pre-defined equipment configuration and/or pre-defined selection options;
    an application processor for controlling application specific programmable functions of the combustion equipment, the application processor being separate from the safety processor but in communication with the safety processor via a communication link;
    wherein the application specific programmable functions are programmable by a user and the application specific programmable functions of the user are prevented from overriding or otherwise affecting the safety functions of the safety processor.

2. The combustion controller of claim 1 further comprising:
- a plurality of safety input/outputs (I/O) controlled by the safety processor and dedicated to the safety functions;
- a plurality of application input/outputs (I/O) controlled by the application processor and dedicated to the application specific programmable functions;
- a plurality of configurable input/outputs (I/O) controlled by the safety processor;
- wherein each of the plurality of configurable input/outputs (I/O) are configurable by the safety processor to be selectively controllable by the application processor via the communication link and the safety processor.

3. The combustion controller of claim 2, wherein the safety processor is configurable with a selected one of two or more pre-defined equipment configurations, wherein each of the two or more pre-defined equipment configurations correspond to a different combustion equipment configuration.

4. The combustion controller of claim 3, wherein a first one of the two or more pre-defined equipment configurations requires a first set of the plurality of configurable input/outputs (I/O) for supporting the safety functions, and a second one of the two or more pre-defined equipment configurations requires a second set of the plurality of configurable input/outputs (I/O) for supporting the safety functions, wherein the first set is different from the second set.

5. The combustion controller of claim 4, wherein:
- the first set of the plurality of configurable input/outputs (I/O) does not include one or more of the plurality of configurable input/outputs (I/O); and
- wherein when the safety processor is programmed with the first one of the two or more pre-defined equipment configurations, the one or more configurable input/outputs (I/O) that are not included in the first set of the plurality of configurable input/outputs (I/O), and thus are not required by the safety processor to support a safety function, can be made selectively controllable by the application processor through the communication link and the safety processor via a request from the application processor.

6. The combustion controller of claim 5, wherein:
- the second set of the plurality of configurable input/outputs (I/O) does not include one or more of the plurality of configurable input/outputs (I/O); and
- wherein when the safety processor is programmed with the second one of the two or more pre-defined equipment configurations, the one or more configurable input/outputs (I/O) that are not included in the second set of the plurality of configurable input/outputs (I/O), and thus are not required by the safety processor to support a safety function, can be made selectively controllable by the application processor through the communication link and the safety processor via a request from the application processor.

7. The combustion controller of claim 1, wherein the safety processor and the application processor are located within a common housing.

8. The combustion controller of claim 1, wherein the safety processor and the application processor are secured to a common circuit board and located within a common housing.

9. The controller of claim 6, wherein the common housing also locates the plurality of safety input/outputs (I/O), the plurality of application input/outputs (I/O), and the plurality of configurable input/outputs (I/O).

10. The combustion controller of claim 1, further comprising an expansion module port, wherein by connecting an expansion module to the expansion module port, the number of application input/outputs (I/O) that are controlled by the application processor and dedicated to the application specific programmable functions is increased.

11. The combustion controller of claim 1, wherein in response to a request from the application processor, the safety processor determines if a configurable input/output (I/O) can be selectively controllable by the application processor.

12. The combustion controller of claim 1, wherein a safety function of the safety processor includes a burner control function.

13. The combustion controller of claim 1, wherein an application specific programmable function includes a temperature schedule.

14. The combustion controller of claim 3, wherein each of the two or more pre-defined equipment configurations are certified to pre-defined safety standards.

15. A combustion controller for controlling combustion equipment, the combustion controller comprising:
- a housing;
- a safety processor and an application processor located within the housing, the safety processor for controlling safety functions of the combustion equipment, and the application processor for controlling application specific programmable functions of the combustion equipment;
- the application processor being partitioned from the safety processor and in communication with the safety processor via a bi-directional communication link;
- the safety functions being pre-programmed with only pre-defined equipment configuration and/or pre-defined selection options such that a user cannot extend beyond the safety functions of the safety processor; and
- the application specific programmable functions being programmable by a user, wherein because of the partitioning of the application processor and the safety processor, the application specific programmable functions of the user are preventing from overriding or otherwise affecting the safety functions of the safety processor.

16. The combustion controller of claim 15 further comprising:
- a plurality of safety input/outputs (I/O) controlled by the safety processor and dedicated to the safety functions;
- a plurality of application input/outputs (I/O) controlled by the application processor and dedicated to the application specific programmable functions;
- a plurality of configurable input/outputs (I/O) controlled by the safety processor;
- wherein the common housing locates and provides access to the plurality of safety input/outputs (I/O), the plurality of application input/outputs (I/O), and the plurality of configurable input/outputs (I/O); and
- each of the plurality of configurable input/outputs (I/O) being configurable via the safety processor to be selectively controllable by the application processor via the communication link and the safety processor.

17. The combustion controller of claim 16, wherein the safety processor is configurable with a selected one of two or more pre-defined equipment configurations, wherein each of the two or more pre-defined equipment configurations correspond to a different combustion equipment configuration, and wherein for at least one of the two or more pre-defined equipment configurations, the safety processor assigns at least one of the plurality of configurable input/outputs (I/O) to be controllable by the application processor via the communication link and the safety processor.

* * * * *